Nov. 17, 1936.　　　　C. G. BELDEN　　　2,060,970
SPACER
Filed Jan. 13, 1936

Inventor
Clements G. Belden
By Blackmore, Spencer & Flint
Attorneys

Patented Nov. 17, 1936

2,060,970

UNITED STATES PATENT OFFICE 2,060,970

SPACER

Clements G. Belden, Royal Oak, Mich., assignor to General Motors Corporation, Detroit, Mich., a corporation of Delaware Application January 13, 1936, Serial No. 58,914

2 Claims. (Cl. 189—34)

This invention relates to frames used on automotive vehicles, and has particular reference to a spacer positioned between the sides of an enclosed channel.

In modern automotive vehicle practice when a box section type of longitudinal member is used for the side bar of a frame and it is desired to pass a bolt through the channel of the box section to secure in place a bracket for the engine mounting or for any other purpose, it has been found desirable to place a spacer around the bolt and cause this spacer to contact the insides of the channel so that when the nut is tightened on the bolt there will not be the tendency to pull the two sides of the channel toward each other and thereby give a certain amount of resiliency to or bow the construction. It is the object of the present invention to enable the application of a bolt passing directly through both sides of the channel bar and also enable the application of a spacer between the insides of the channel.

The object of the invention is accomplished by forming two mating openings in the opposite sides of the box section forming one hole (preferably the one at the outer side) larger than the one at the inner side. A tubular spacer is used which is of a size sufficiently small to pass through the outer opening, but too large to pass through the inner opening. By placing a bolt inside the tubular spacer and passing the bolt and spacer through the first opening, the spacer end will strike the channel inside around the second opening. The end of the spacer tube at the larger hole will be spread by a conical shaped shank section on the bolt. The tightening of the bolt will draw the conical section into the tubular spacer and cause the spreading of the spacer to a size such that it is larger than the larger opening and will thereby cause the tube to contact with both insides of the channel.

As an optional construction the openings may be provided with lateral recesses and suitable tongues on the spacer will fit in the recesses to hold the tube in place.

Figure 1:
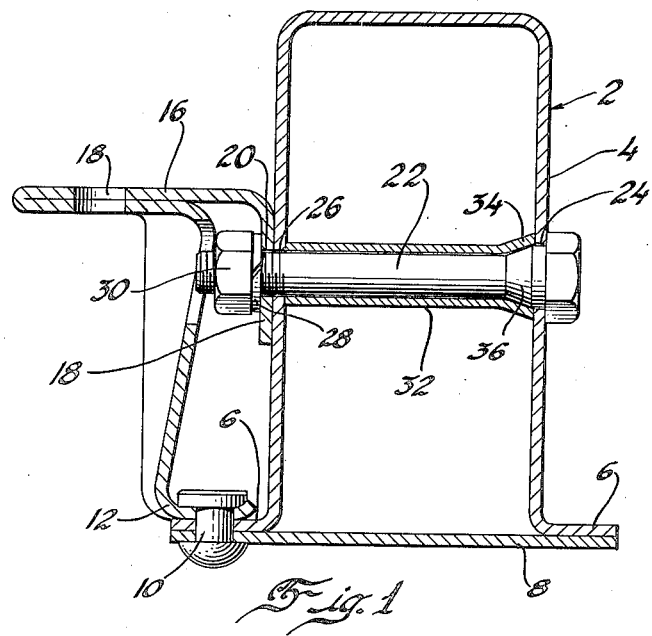
Figure 1 shows a section through one of the side bars of an automobile frame showing the invention applied.

On the drawing, 2 indicates as a whole one of the side members of an automobile frame or chassis. The side member comprises the inverted U-shaped channel 4 having the flanges 6. The U-shaped channel is closed at its bottom by means of a plate 8 which may be welded to the flange 6 or riveted thereto if desired. A rivet 10 passing through the plate 8 and the flanges 6 holds in place the foot 12 of a bracket 16 which is provided with a suitable opening 18 for the reception of a bolt of the mounting of the body, the engine or for any other desired purpose. The bracket 16 is provided with a flange 18 having a bolt opening 20 and in order that the bracket may be more firmly secured to the frame a bolt 22 is passed through openings 24 in the outer web of the channel 4 and opening 26 in the inner web of the channel. A suitable lock washer 28 and nut 30 hold the bolt in place. A spacer 32 surrounds the bolt and contacts both sides of the inside of the channel 4 as is best shown in Figure 1. The spacer 32 has the outer conical portion 34 which is formed by the conical end portion 36 on the shank of the bolt 22. When the nut 30 is screwed on the threaded end of the bolt 22 the conical end 36 will be drawn into the tapered end of the spacer to cause it to spread to the shape shown in Figure 1.

Figure 2:
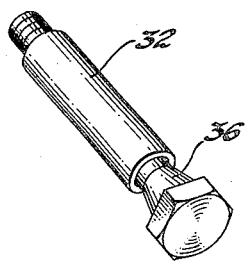
Figure 2 is a perspective view of the bolt with the tubular spacer assembled thereon.

From a closer examination of Figure 1 it will be noted that the opening 24 is of a size to allow the passage therethrough of the spacer 32 while the opening 26 is smaller than the tube. When the assembly shown in Figure 2 is passed through the opening 24 the threaded end of the bolt will pass entirely through the openings 26 and 20 and the bolt will be stopped only when the conical end 36 strikes the unexpanded end of the spacer 22. The inner end of the spacer tube 32 will abut against the web of the channel 4 around the hole 26. While applying the nut 30 and drawing it tightly the conical end 36 will be pulled into the end of the spacer 32 and cause the spacer end to expand into the conical formation 34 to cause the tube ends to contact with both insides of the channel 4 and act as a spacer for the bolt.

Figure 3:
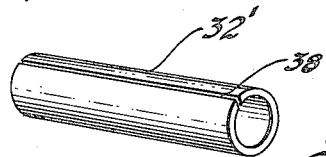
Figure 3 is a perspective view of a spacer split through its length.

Referring to Figure 3, the spacer member 32' is shown as split or provided with a slit 38 throughout its entire length. This enables the spacer to be formed of flat stock.

Figure 4:
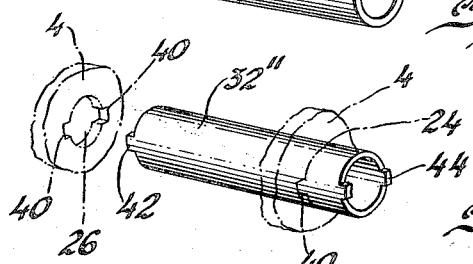
Figure 4 is a perspective view of a spacer having tongues at its ends and showing in dotted outline the web portions of the box section.
Figure 5:
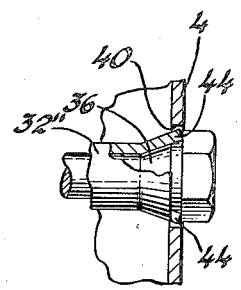
Figure 5 is a sectional view with parts broken away of the form shown in Fig. 4.

If desired, the webs 4 of the channel member 2 may be provided with notches or recesses 40 in the sides of the openings 24 and 26. The spacer 32" is then provided with the tongues 42 at one end and the tongues 44 at the other. When the assembly as shown in Figures 4 and 5 is inserted through the opening 24 the tongues 42 on the one end will enter the notches 40 of the farthermost web of the channel 4 while the tongues 44 at the other tube end will not be in the notches. When the nut 30 is tightened on the bolt the conical portion 36 of the shank will spread the end and the tongues 44 to cause the latter to enter the notches 40 to hold the spacer in place.

Figure 6:
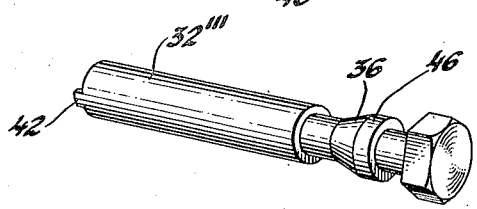
Figure 6 is a view similar to Figure 2 but showing a separate member adjacent the head of the bolt to form the spreading operation instead of forming the section integral as in Figure 2.

If desired, the spacer 32''' may have only the tongues 42 on one end, leaving the other end free as is best shown in Figure 6.

Likewise, the conical shaped portion 36 may be made of a separate piece 46 and the piece 46 slipped over the bolt before the spacer is applied. This construction is shown in Figure 6. In Figures 1 and 2 the conical portion 36 is formed as an integral part of the bolt 22.

I claim:

1. In a spacer for a closed channel having openings in the opposite sides thereof, one opening being larger than the other, a spacer tube adapted to extend through the larger opening only and across the channel to the opposite side around the smaller opening, a bolt surrounded by the spacer tube, a cut out portion at the edge of the smaller opening, a tongue on the tube adapted to fit in the cut out portion, and means operative when the bolt is tightened to cause the end of the tube adjacent the larger opening to expand and contact the edges of the inside of the channel adjacent the opening.

2. In a spacer for a closed channel having openings in the opposite sides thereof, one opening being larger than the other, a spacer tube adapted to extend through the larger opening only and across the channel to the opposite side around the smaller opening, a bolt surrounded by the spacer tube, a cut out portion at the edge of the smaller opening, a tongue on the tube adapted to fit in the cut out portion, a cut out portion at the edge of the larger opening, a tongue on the tube end adjacent the cut out portion of the larger opening, and means operative when the bolt is tightened to cause the second mentioned tongue to be pressed into or expanded into the second named cut out portion.

CLEMENTS G. BELDEN.